United States Patent Office 3,484,477
Patented Dec. 16, 1969

3,484,477
TETRACYCLIC TRIKETONES
John Cameron Turner, West Wickham, England, assignor to Biorex Laboratories Limited, London, England
No Drawing. Filed Apr. 1, 1968, Ser. No. 717,954
Claims priority, application Great Britain, Apr. 11, 1967, 16,589/67
Int. Cl. C07c 69/66, 69/74
U.S. Cl. 260—468.5         2 Claims

ABSTRACT OF THE DISCLOSURE

New tetracyclic triketones derived from the pentacyclic compound, glycyrrhetinic acid, are of pharmaceutical utility and have an anti-inflammatory activity as well as a low toxicity.

---

In U.S. Patent No. 3,281,454, there are described and claimed, inter alia, compounds of the general formula:

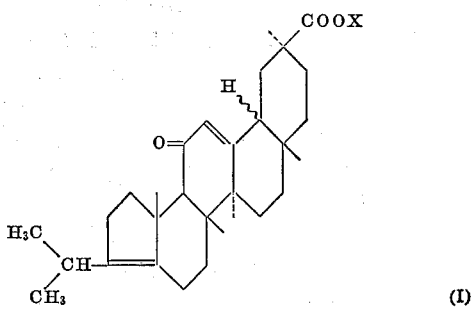

wherein X is a hydrogen atom or an alkyl radical.

According to the present invention, valuable pharmaceutical compounds with an anti-inflammatory activity and a very low toxicity can be obtained from the above compounds of general Formula I by ozonolysis to give the corresponding ozonide, followed by reduction.

According to the present invention, there are provided new compounds of the general formula:

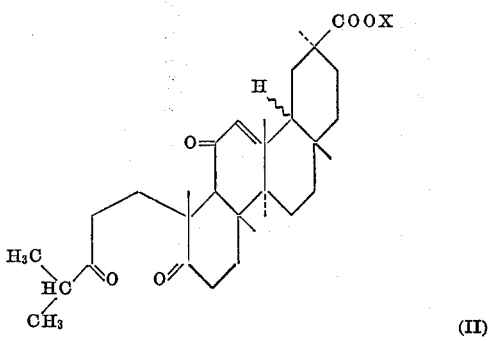

in which X has the same meaning as above.

When X in general Formula II is an alkyl radical, it advantageously contains up to 6 carbon atoms and may have a straight or branched carbon chain. Examples of such alkyl radicals are methyl, ethyl, n-propyl, isopropyl, n-butyl and n-hexyl radicals.

The new compounds according to the present invention can be prepared by dissolving a compound of general Formula I in an appropriate solvent which is inert to ozone, such as dichloromethane or carbon tetrachloride, and then passing ozone through the solution to give the corresponding ozonide, whereafter this ozonide is reduced with any appropriate reducing agent, such as zinc dust and an acid, for example, glacial acetic acid, or with dimethyl sulphide or trimethyl phosphite.

The following example is given for the purpose of illustrating the present invention:

EXAMPLE 1

14.5 g. (grams) of methyl 11-oxo-18α-A-neo-olean-3(5),12-dien-30-oate were dissolved in 720 ml. (milliliters) of dichloromethane, cooled to about −30° C., and ozone passed through at this temperature for about 2 hours. 435 ml. of glacial acetic acid were then added, followed by 72.5 g. of zinc dust, and the reaction mixture thereafter stirred for 3 hours at room temperature and filtered.

The filtrate was poured into 7.2 liters of water, the dichloromethane layer separated and combined with the products of extraction of the aqueous layer with further dichloromethane. The combined dichloromethane solutions were dried over anhydrous sodium sulphate, the solvent distilled off under reduced pressure and the residue dried in a vacuum oven at 70° C. There are thus obtained 13.3 g. of crude methyl 4,5-seco-3,5-11-triketo-18α-olean-12-en-30 oate which was recrystallized from methanol-chloroform (5:1) using 20 ml. of the solvent mixture per gram of material, 7.7 g. of the purified ester being obtained with a melting point of 194–198° C. The compound was further purified by recrystallization from methanol, using 40 ml. per gram, and then had a melting point of 196–198° C.; $[\alpha]_D^{21} = 90.72°$ (c.=2% in chloroform).

Analysis.—$C_{31}H_{45}O_5$ (M.W. 497). Calc.: C, 74.78%; H, 9.11%. Found: C, 74.85%; H, 9.29%.

The compound is insoluble in water, soluble in chloroform, moderately soluble in acetone and slightly soluble in ethanol. The infra-red absorption spectrum (KBr disc) shows maxima at 1670 cm.$^{-1}$ (O=C—C=C—), 1715 cm.$^{-1}$ (—C=O group in a six membered ring) and 1730$^{-1}$ (—C=O ester group); ultra-violet absorption maximum λ max. 248 mμ log ε 4.07.

The present invention also includes within its scope pharmaceutical compositions which comprise one or more of the new compounds according to the present invention, all of which are useful for the purposes of this invention, together with a significant amount of a pharmaceutical carrier. The invention especially includes such compositions made up for oral or parenteral administration (e.g. via the subcutaneous, intra-muscular or intravenous routes).

Solid compositions for oral administration include compressed tablets, pills, dispersible powders and granules. In such solid compositions, one or more of the active compounds of the present invention is or are admixed with at least one inert diluent, such as calcium carbonate, potato starch, alginic acid or lactose. The compositions may also comprise, as in normal practice, additional substances other than inert diluents, for example, lubricating agents, such as magnesium stearate.

Liquid compositions for oral administration include pharmaceutically-acceptable emulsions, solutions, suspensions, syrups and elixirs containing inert diluents commonly used in the art, such as water and liquid paraffin; besides inert diluents, such compositions may also comprise adjuvants, such as wetting and suspension agents, and sweetening and flavoring agents.

The compositions according to the present invention, for oral administration, include capsules of absorbable material, such as gelatine, containing at least one of the new active compounds of the present invention, with or without the addition of diluents or excipients.

Preparations according to the present invention for parenteral administration include sterile aqueous or non-aqueous solutions, suspensions and emulsions. Examples of non-aqueous solvents or suspending media are propylene glycol, polyethylene glycol, vegetable oils, such as olive oil, and injectable organic esters, such as ethyl oleate. These compositions may also contain adjuvants, such as wetting, emulsifying and dispersing agents. They may be sterilized, for example, by filtration through a bacteria-retaining filter, by incorporation in the compositions of sterilizing agents, by irradiation or by heating. They may also be produced in the form of sterile solid compositions, which can be dissolved in sterile water or some other sterile injectable medium immediately before use.

The percentage of active ingredient (I) in the compositions of the present invention may be varied, it being necessary that it should constitute a proportion such that a suitable dosage for the desired therapeutic effect shall be obtained. Obviously, several dosage units can be administered at the same time. The preparations of the present invention should preferably be administered so as to give, in the case of oral administration, 20–750 mg. of active substance per day and, in the case of parenteral administration, 20 to 500 mg. of active substance per day.

Thus-administered preparations of this invention are useful in human and in veterinary medicine in the treatment of inflammatory conditions associated, for example, with afflictions such as pruritus, dermatoses, eczema and gingivitis in man or animals (e.g. dogs, etc.).

The following example illustrates the pharmaceutical compositions according to the present invention:

EXAMPLE 2

Tablets (200 mg.) are prepared containing:

| | Mg. |
|---|---|
| (a) Methyl 4,5-seco-3,5,11-triketo-18α-olean-12-en-30-oate | 50 |
| (b) Starch | 146 |
| (c) Magnesium stearate | 4 |

Any of the other compounds comprised within Formula I can replace the active ingredient (a) in the aforesaid tablets.

Having thus disclosed the invention, what is claimed is:

1. A compound of the formula:

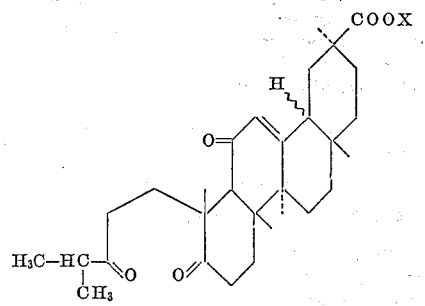

wherein X is a hydrogen atom or a straight or branched alkyl group of 1 to 6 carbon atoms, inclusive.

2. A compound according to claim 1 which is methyl 4,5-seco-3,5,11-triketo-18α-olean-12-en-30-oate.

References Cited

UNITED STATES PATENTS

| 3,084,185 | 4/1963 | Gottfried et al. | 260—514.5 |
| 3,281,454 | 10/1966 | Askam et al. | 260—468.5 |
| 3,311,613 | 3/1967 | Davies | 260—468.5 |

LORRAINE A. WEINBERGER, Primary Examiner

W. T. CHOCTOW, Assistant Examiner

U.S. Cl. X.R.

260—514.5; 424—305, 317